United States Patent [19]

Kosmowski

[11] 4,423,880
[45] Jan. 3, 1984

[54] HYDRAULIC CHUCK

[75] Inventor: Wojciech B. Kosmowski, San Juan Capistrano, Calif.

[73] Assignee: Cooper Industries, Inc., Houston, Tex.

[21] Appl. No.: 236,846

[22] Filed: Feb. 23, 1981

[51] Int. Cl.³ ............................................. B23B 31/30
[52] U.S. Cl. ....................................... 279/4; 279/1 D
[58] Field of Search .......................... 279/2 A, 4, 1 D

[56] References Cited

U.S. PATENT DOCUMENTS

| 3,370,842 | 2/1968 | Sykes | 279/4 |
| 3,507,507 | 4/1970 | Tobler | 279/4 |
| 3,521,894 | 7/1970 | Haviland | 279/4 |
| 3,542,354 | 11/1970 | Fitzpatrick | 279/4 |
| 3,679,219 | 7/1972 | Cameron | 279/4 |
| 3,830,509 | 8/1974 | Weber | 279/4 |

*Primary Examiner*—William R. Briggs
*Assistant Examiner*—Daniel W. Howell
*Attorney, Agent, or Firm*—Spensley, Horn, Jubas & Lubitz

[57] ABSTRACT

An improved chuck utilizing a self-contained hydraulic system integrated to the spindle rotor to radially flex a thin walled diaphragm so as to grip a collet and a tool therein. Pressure in the hydraulic system is controlled by means of a plunger which is forced to a position which compresses the hydraulic fluid by means of a spring. The plunger may be pushed against the action of the spring in order to decompress the fluid by means of a mechanical release which is removed from the plunger during the operation of the chuck. A built-in hydraulic amplification system achieves high clamping pressure with a small actuating force. Accordingly, only a small actuating force is also required to relieve the clamping pressure so that the chuck bearings are not overloaded while the tool is being released.

10 Claims, 5 Drawing Figures

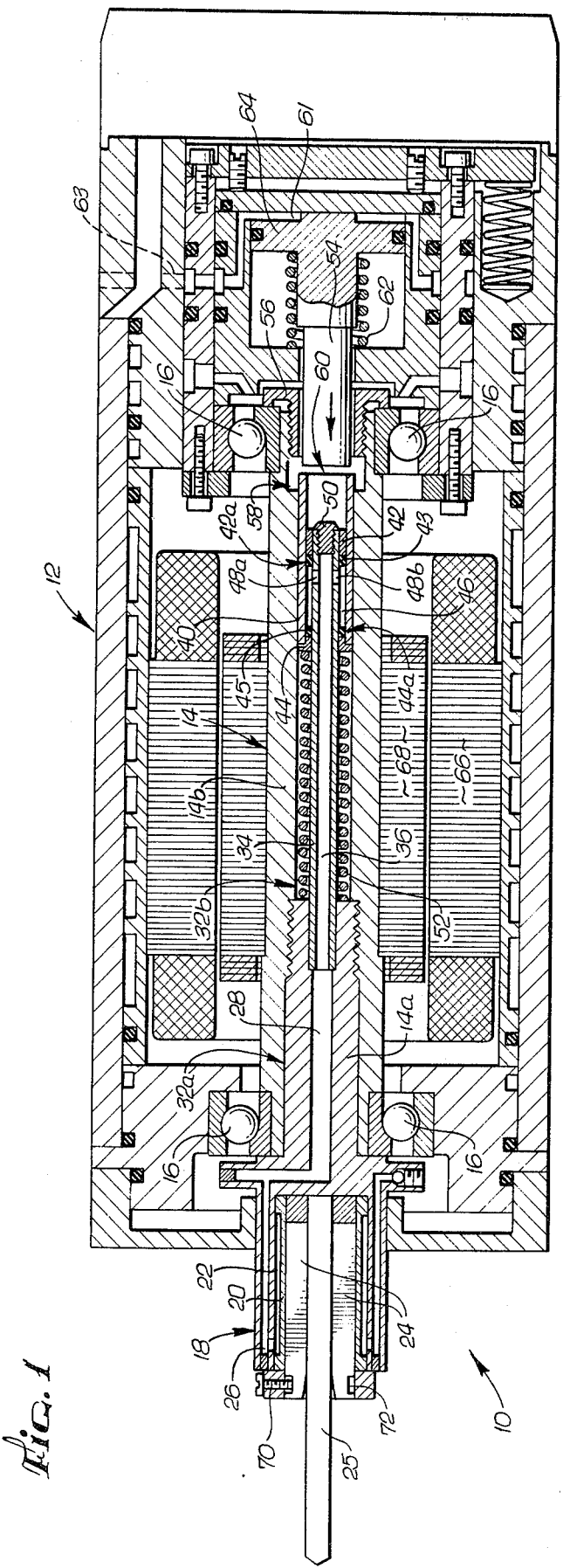
Fig. 1
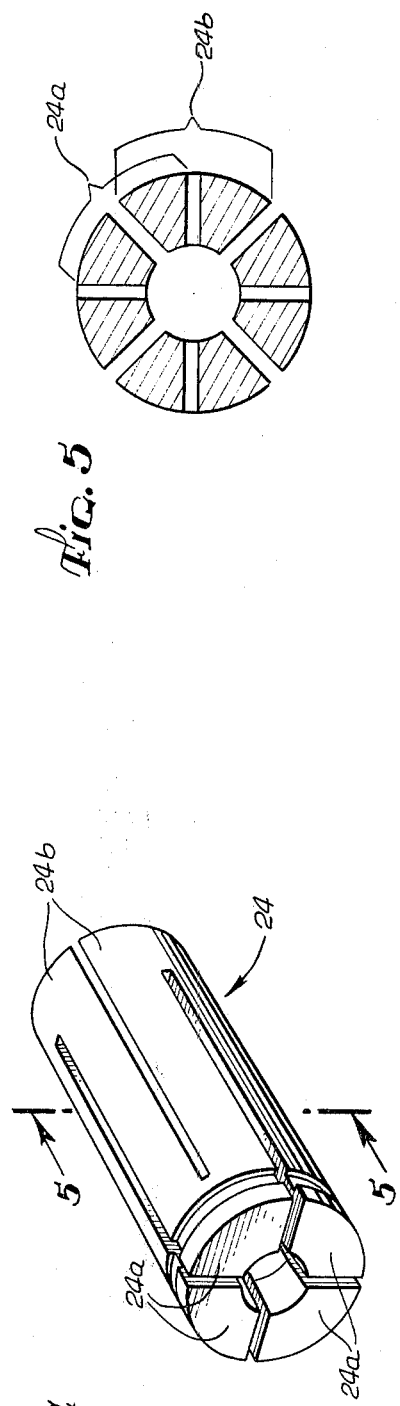
Fig. 4
Fig. 5

HYDRAULIC CHUCK

BACKGROUND OF THE INVENTION

1. Field of the Invention

The present invention relates to machine tools and more particularly to chucks for holding a tool or a workpiece in a machine.

2. Description of the Prior Art

Hydraulic pressure has often been utilized to radially flex a thin walled diaphragm to frictionally grip a tool within a chuck. Many such chucks utilize an open hydraulic system, wherein pressurized hydraulic fluid is supplied from an outside source when the gripping of a tool is required, and the supply of fluid is removed in order to release the tool. Systems of this type are disclosed in U.S. Pat. No. 2,920,895 to Krouse and U.S. Pat. No. 3,542,354 to Fitzpatrick. These require an active connection between the hydraulic fluid supply and the chuck during the operation of the chuck.

A partially enclosed hydraulic chuck is disclosed in U.S. Pat. No. 3,251,604 to Better, which utilizes a spring member to force a piston or plunger into a hydraulic fluid passage in order to increase the pressure of the fluid located in the passage. The passage leads to a chamber adjacent a thin walled diaphragm, and the increase in pressure causes the diaphragm to be flexed by the hydraulic fluid located in the chamber. Hydraulic fluid is supplied to replenish the fluid in the passage and the chamber, and to provide a force to move the piston back against the force of the spring so as to release a tool gripped by the chuck.

Self-contained hydraulic chucks have been disclosed which do not utilize an outside source of hydraulic fluid to grip or to release a tool. These chucks also often have a piston which is manually or power actuated to apply pressure to the hydraulic fluid. The manually actuated systems have used springs, screws, cams and the like to force the piston into the hydraulic passage or chamber.

In each of the above systems, in order to release the tool, the piston is pulled or withdrawn in some manner from the chamber or passage in order to reduce the hydraulic pressure on the diaphragm. Thus, for example, a spindle or cam used to drive the piston forward into the passage is withdrawn to allow the piston to return. This may not release the tool quickly enough or completely enough for certain high speed and automated operations in which the rapid change of tools within the chuck is required.

Alternatively, the piston may be mechanically hooked or clamped and pulled from the chamber to reduce the pressure in order to release the tool. This may require a relatively complicated mechanical arrangement. Other chucks may use hydraulic pressure from an outside source to move the piston back. This would require an active connection between a hydraulic fluid supply and the chuck which may be cumbersome, expensive and otherwise disadvantageous for high speed operations.

SUMMARY OF THE INVENTION

It is an object of the present invention to provide a chuck obviating, for practical purposes, the above-mentioned limitations, particularly in a manner requiring a relatively uncomplicated mechanical arrangement.

A preferred embodiment of the present invention provides a self-contained hydraulic chuck for use with drills or other power tools comprising a housing and a shaft supported within the housing. The shaft has a first hydraulic fluid chamber and a head section integral with the shaft and extending from an end of the housing. The head section has a diaphragm secured within the head section, with the diaphragm and the head section defining a second hydraulic fluid chamber. The head section and the shaft define a hydraulic fluid channel connecting the first chamber to the second chamber. The chuck further comprises a collet located within the head section and abutting the diaphragm, for gripping a tool therein, and a plunger which extends into the first hydraulic fluid chamber. A spring forces the plunger further into the first chamber thereby compressing the hydraulic fluid within and flexing the diaphragm against the collet so as to force the collet inward. Mechanical means are provided for pushing the plunger against the force of the spring when it is desired to remove a tool from the chuck or insert a tool into the chuck, thereby reducing pressure on the hydraulic fluid and preventing the diaphragm from being flexed.

Since the plunger is pushed to relieve the pressure rather than pulled or otherwise allowed to withdraw, a relatively simple mechanical arrangement can be used to release a tool. Devices which hook or grip the plunger or piston in order to pull it from the chamber are often more difficult to manufacture and hence can result in a more expensive chuck. Furthermore, no outside source of hydraulic pressure is required to actuate the device.

These and other objects and advantages will become more apparent from the following detailed description and accompanying drawings.

BRIEF DESCRIPTION OF THE DRAWINGS

In the drawings:

FIG. 1 is a side view, in section, of a chuck embodying the present invention;

FIG. 4 is a perspective view of a collect which forms a part of the chuck; and

FIG. 5 is a cross-sectional view along the line 5—5 of the collet of FIG. 4.

DESCRIPTION OF THE PREFERRED EMBODIMENT

Figure 2:
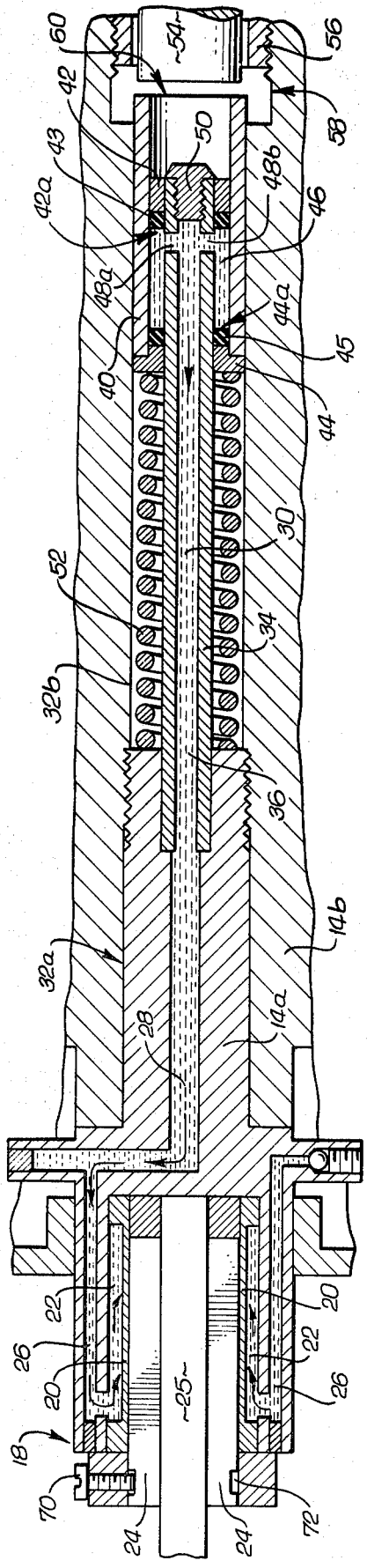
FIG. 2 is a side view, in section, of a partially broken away portion of the chuck of FIG. 1, illustrating the chuck in a gripping mode.

Referring to FIG. 1, a chuck 10 for use with a high speed drill is shown. The chuck 10 includes an outer housing 12 which rotatably supports a shaft 14 by means of a plurality of ball bearings 16. The shaft 14 comprises a first cylindrical segment 14a threaded into a second cylindrical segment 14b. During operation, the shaft 14 will be rotating at a rate of up to 80,000 revolutions per minute. A cylindrical head section 18 which is integral with the shaft segment 14a extends from the front of the housing 12. The head section 18 includes a cylindrical opening in its interior to which is attached a flexible thin walled cylindrical metal diaphragm 20. A cylindrical cavity or chamber 22 is defined between the wall of the head section 18 and the diaphragm 20. A collet 24, which is used to grip the shank of a tool such as a drill bit 25, fits into the opening defined by the diaphragm 20. As can be seen more clearly in FIGS. 4 and 5, the collet 24 includes four radial segments 24a which are connected to a common cylindrical base member which also has four radial segments 24b. In operation, the wall of the diaphragm 20 will be flexed inward, thus forcing the radial segments 24a and 24b together and causing them to tightly grip the tool shank.

Referring further to FIG. 1, the chamber 22 is connected to or fed by a channel 26 which is located in the head section 18. The channel 26 is in turn connected to a central channel 28 which passes through the central axis of the shaft segment 14a. The shaft segment 14b has a central cylindrical cavity or bore comprising a first bore 32a and a smaller co-axial bore 32b. The shaft segment 14a fits within the bore 32a and is threaded into the shaft segment 14b as shown in FIG. 1.

The shaft segment 14a has an elongated hollow post 34 which defines a channel 36. The segment 14a centrally supports the post 34 within the bore 32b, with the channel 36 in fluid communication with the channel 28 of the shaft segment 14a.

A tubular piston or plunger, hereinafter referred to as a plunger 40, slidably fits in the bore 32b around the post 34. A cylindrical sleeve 42 is fixed at one end of the post 34 and extends to the inside wall of the plunger 40. The sleeve 42 has a seal ring 43 to define a sleeve wall 42a which forms a fluid tight slidable seal with the inside wall of the plunger 40.

The plunger 40 has a cylindrical end cap 44 fixed to an end of the plunger 40, which has a seal ring 45 to define an end wall 44a, opposing the sleeve wall 42a of the sleeve 42. The end wall 44a forms a fluid tight slidable seal with the outside wall of the post 34 to thereby define a second cylindrically-shaped hydraulic passage or chamber 46 between the inner wall of the plunger 40, the outer wall of the post 34 and the walls 44a and 42a of the end cap 44 and post sleeve 42, respectively. A pair of ports 48a and 48b couple the chamber 46 to the channel 36 of the post 34. Thus the hydraulic fluid channels 26, 28 and 36 form a single continuous channel connecting the first hydraulic fluid chamber 22 surrounding the cylindrical diaphragm 20 to the second hydraulic fluid chamber 46. A screw 50 seals the end of the post 34 to enclose the channel 36 of the post 34.

The chambers 22 and 46 and the channels 26, 28 and 36 are all filled with a supply of hydraulic fluid 30. If sufficient pressure is applied to the hydraulic fluid 30, the diaphragm 20 will be caused to flex inwardly, thus gripping the collet 24 and forcing the radial segments 24a and 24b inward as shown in FIG. 2. In the normal, or released condition, the pressure of the hydraulic fluid 30 will not be sufficient to cause the diaphragm 20 to flex inwardly. However, by sliding the plunger 40 so that the end wall 44a of the plunger 40 moves closer to the sleeve wall 42a of the sleeve 42 thereby decreasing the volume of the chamber 46, the pressure of the hydraulic fluid 30 can be increased to an extent which is sufficient to flex the cylindrical diaphragm 20 inward and cause the collet 24 (and a tool within it) to be gripped.

In order to provide the forces required to flex the diaphragm 20 inward to clamp the tool without requiring the application of a great deal of force, the chuck 10 is designed to have a built-in force amplification. The area of the end wall 44a of the plunger 40 is quite small and the pressure applied to it will be multiplied when transferred to the diaphragm 20 via the hydraulic fluid 30. This results from the fact that pressure per unit area remains the same throughout the hydraulic fluid 30, and the surface area of the diaphragm 20 is much greater than that of the end wall 44a. Therefore, the application of a relatively small amount of force to the plunger 40 will result in a great deal of force being applied to the diaphragm 20. Consequently, only a relatively small force is required to push the plunger back to release the tool.

Referring further to FIG. 2, a spring 52 is located inside the bore 32b and acts on the end cap 44 so as to force the plunger 40 into the chamber 46 thereby decreasing the internal volume of the chamber 46. Therefore, the spring 52 provides the necessary force to compress the hydraulic fluid 30 and flex the diaphragm to compress the collet 24, with the aid of the multiplication factor of the system.

Figure 3:
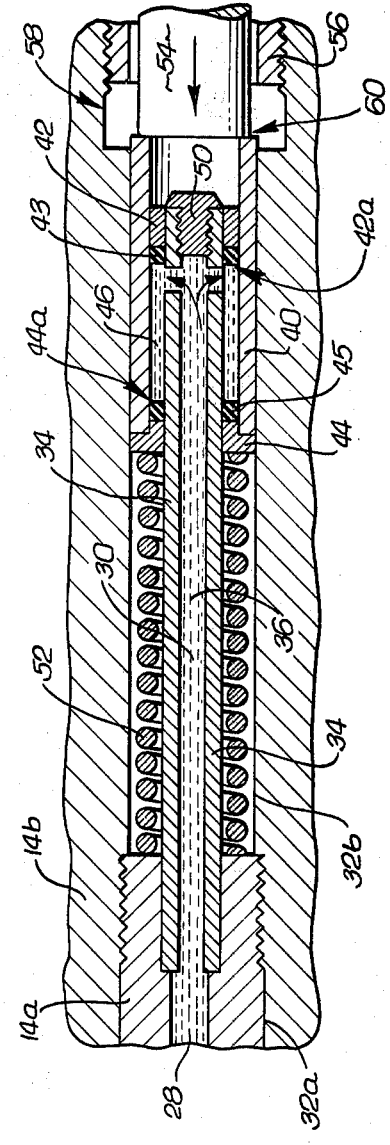
FIG. 3 is a side view, in section, of a broken away portion of the chuck of FIG. 1, illustrating the chuck in a release mode.

In order to insert or remove a tool from the chuck 10, the action of the spring 52 is counteracted and the plunger 40 is moved to the left (as shown in FIG. 3) by means of a rod 54. The rod 54 is used to push the plunger 40 toward the spring thereby increasing the internal volume of the chamber 46 and reducing the pressure of the hydraulic fluid. FIG. 1 shows the rod 54 slidably and rotatably supported within the housing 12 by a bearing 56 located within an enlarged cylindrical bore 58 at the end of the shaft segment 14b.

An end wall 60 of the plunger 40 extends beyond the post 34 and post sleeve 42 and into the bore 58. The rod 54 is moved to the left (as shown in FIG. 3) either manually or powered, to engage the end wall 60 and push the plunger to the left without the need to grip or hook the plunger. Only a small force is required to push the plunger 40 back since only a small force was required to push the plunger into the chamber to grip the tool. With the pressure on the hydraulic fluid reduced, the diaphragm 20 can return to its unflexed position which in turn relieves the compression forces on a tool within the collet 24, allowing the tool to be released.

In the illustrated embodiment, the rod 54 is driven to release the tool by air pressure from air entering a chamber 61 to the right of the rod 54 from an air passage 63 connected to an outside source of compressed air. A spring 62 surrounds the rod 54 and presses against a flange 64 of the rod 54 to return the rod 54 to its original position after the tool is inserted or removed and the air pressure in the chamber 61 is released to decouple the rod 54 from the plunger 40. Upon release of the rod 54, the spring 52 returns the plunger 40 to the right, thereby compressing the hydraulic fluid and causing the collet 24 to be compressed again (as shown in FIG. 2). It should be recognized that other mechanical means for pushing the plunger 40 against the force of the spring 52 may be utilized, such as levers, cams and screws. An air pressure activated rod such as the rod 54 is desired because of its simple design and economical manufacture.

The shaft 14 is rotated within the housing 12 by a motor comprising stator windings 66 and rotor windings 68. During this rotation, the rod 54 under the urging of the spring 64, is not in contact with the plunger 40 and therefore does not interfere with the rotation of the shaft 14. The head section 18 of the housing 12 has a screw 70 which engages a groove 72 of the collet 24 when the rod 54 is pushed in, in order to prevent the collet 24 from falling out of the chuck when the diaphragm 20 releases the collet.

In summary, the present invention comprises an improved chuck which utilizes a completely closed hydraulic system to provide a gripping action to a collet.

Fluid in the hydraulic system is compressed by means of a plunger which is moved within a chamber which is part of the hydraulic system. The force required to move the plunger farther into the chamber is supplied by a spring, and a mechanical release is used to counteract the force of the spring by pushing the plunger in the opposite direction so as to decompress the hydraulic fluid. The mechanical release is completely decoupled from the plunger during the operation of the chuck. Accordingly, a chuck of great simplicity and reliability is provided.

It will, of course, be understood that modifications of the present invention in its various aspects will be apparent to those skilled in the art, some being apparent after study, and others being merely matters of routine mechanical design. For example, other shapes and configurations of pistons or plungers may be employed such as non-cylindrical pistons having a flange for the mechanical means to engage to push the piston back to release the tool. As such, the scope of the invention should not be limited by the particular embodiment herein described, but should be defined only by the appended claims, and equivalents thereof.

Various features are set forth in the following claims.

I claim:

1. A self-contained hydraulic chuck for use with high speed drills or other high speed rotational power tools comprising:
    a housing;
    a shaft having an axis and supported within the housing;
    a hollow tubular plunger and a central structure within the shaft defining a first hydraulic fluid chamber;
    a head section coupled to the shaft and extending from an end of the housing, said head section having a central opening;
    a diaphragm secured within the central opening of the head section, said diaphragm and said head section defining a second hydraulic fluid chamber, said head section and said shaft having hydraulic fluid channel means for coupling the first chamber to the second chamber;
    a collet, located within the central opening of the head section and abutting the diaphragm, for gripping a tool;
    said hollow tubular plunger being co-axially movable on said central structure and within the shaft so as to vary the volume of the first hydraulic fluid chamber;
    spring means for forcing the plunger in a direction which decreases the volume of the first hydraulic fluid chamber and compresses the hydraulic fluid, thereby flexing the diaphragm against the collet so as to force the collet inward to grip a tool; and
    mechanical means for pushing the plunger against the force of the spring means, thereby reducing the pressure on the hydraulic fluid and preventing the diaphragm from being flexed, to thereby allow a tool to be inserted into or removed from the collet, said mechanical means being decoupled from said plunger when the chuck is gripping a tool.

2. The chuck of claim 1 wherein the shaft has a first cavity and said central structure defines a post extending into the first cavity, said post including a fluid passage which forms a portion of the channel connecting the first hydraulic chamber to the second hydraulic chamber wherein said first cavity contains the first hydraulic fluid chamber.

3. The chuck of claim 2 wherein the plunger is slidably supported within the first cavity around the post, wherein the inner surface of the plunger is spaced from the outer surface of the post, said chuck further including a first seal attached to the post and extending to the plunger and a second seal attached to the plunger and extending to the post, wherein the first hydraulic chamber is defined by the space between the first and second seals, the inner surface of the plunger and the outer surface of the post.

4. The chuck of claim 1 wherein the mechanical means comprises a rod extending into the housing for engaging the plunger and pushing the plunger against the force of the spring means.

5. The chuck of claim 4 wherein the rod is actuated by an outside source of compressed air to push the plunger to release the tool.

6. The chuck of claim 4 further comprising a second spring means for disengaging the rod from the plunger after the tool is inserted or released.

7. The chuck of claim 1 wherein the shaft has a first cavity and said central structure defines a post extending into the first cavity, and the plunger is slidably supported within the first cavity around the post, wherein the inner surface of the plunger is spaced from the outer surface of the post, said chuck further including a first seal attached to the post and extending to the plunger and a second seal attached to the plunger and extending to the post, wherein the first hydraulic chamber is defined by the space between the first and second seals, the inner surface of the plunger and the outer surface of the post.

8. The chuck of claim 7 wherein the plunger has an annular end piece supporting the second seal and said spring means is engaged against the end piece forcing the second seal toward the first seal.

9. A chuck for use with a high speed drill or the like, comprising:
    a housing;
    a shaft rotatably supported within the housing, said shaft having a first cylindrical cavity and an elongated post extending axially into the first cavity;
    a tubular plunger slidably supported within the first cavity around the post, said post having a fixed sleeve forming a fluid tight and slidable seal with the inside surface of the plunger, said plunger having an end wall forming a fluid tight and slidable seal with the post to define a first hydraulic fluid chamber between the post and the plunger, said plunger having a rim extending beyond the post sleeve;
    a cylindrical head section connected to the shaft and extending from an end of the housing, said head section including a central opening;
    a thin walled tubular diaphragm secured within the central opening of the head section, said diaphragm and said head section defining a second hydraulic fluid chamber, said head section and said shaft including at least one hydraulic fluid channel connecting the first chamber to the second chamber;
    a collet, located within the diaphragm, for gripping a tool therein;
    spring means for forcing the plunger end wall towards the post sleeve thereby compressing hydraulic fluid within the first chamber and flexing the diaphragm radially inward so as to force the collet inward to grip the tool;
and
rod means for pushing the plunger rim back against the force exerted by the spring means thereby reducing pressure on the hydraulic fluid and preventing the diaphragm from flexing radially inward to allow a tool to be inserted or removed from the collet, said rod means being decoupled from said plunger when the chuck is gripping a tool.

10. A chuck for use with a high speed drill or the like, comprising:
a housing;
a shaft rotatably supported within the housing, said shaft having a first cylindrical cavity and an elongated post extending axially into the first cavity;
a tubular plunger slidably supported within the first cavity around the post, said post having a fixed sleeve which has a fluid tight and slidable seal with the inside surface of the plunger, said plunger having an end wall which has a fluid tight and slidable seal with the post to define a first hydraulic fluid chamber for hydraulic fluid between the post and the plunger;
a cylindrical head section connected to the shaft and extending from an end of the housing, said head section including a central opening;
a thin walled tubular diaphragm secured within the central opening of the head section for holding a tool within when the diaphragm is flexed inward, said diaphragm and said head section defining a second hydraulic fluid chamber, said head section and said shaft including at least one hydraulic fluid channel coupling the first chamber to the second chamber;
spring means for forcing the plunger end wall towards the post sleeve thereby compressing the hydraulic fluid within the first chamber and flexing the diaphragm radially inward to hold the tool; and
means for pushing the plunger back against the force exerted by the spring means thereby reducing pressure on the hydraulic fluid and relaxing the diaphragm to allow a tool to be inserted or removed from the chuck, said pushing means being decoupled from said plunger when the chuck is holding a tool.

* * * * *